(12) United States Patent
Hagiwara et al.

(10) Patent No.: US 12,371,861 B2
(45) Date of Patent: Jul. 29, 2025

(54) ASPHALT FINISHER

(71) Applicant: SUMITOMO CONSTRUCTION MACHINERY CO., LTD., Tokyo (JP)

(72) Inventors: Kazuaki Hagiwara, Chiba (JP); Tetsuya Watanabe, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 963 days.

(21) Appl. No.: 17/448,399

(22) Filed: Sep. 22, 2021

(65) Prior Publication Data

US 2022/0002953 A1 Jan. 6, 2022

Related U.S. Application Data

(63) Continuation of application No. PCT/JP2020/013077, filed on Mar. 24, 2020.

(30) Foreign Application Priority Data

Mar. 25, 2019 (JP) .................. 2019-057339

(51) Int. Cl.
*E01C 19/48* (2006.01)
*B60Q 9/00* (2006.01)

(52) U.S. Cl.
CPC ............ *E01C 19/4873* (2013.01); *B60Q 9/00* (2013.01); *E01C 2301/16* (2013.01)

(58) Field of Classification Search
CPC .... E01C 19/4873; E01C 2301/16; B60Q 9/00
USPC ................. 404/75, 84.05–84.5, 118
See application file for complete search history.

(56) References Cited

U.S. PATENT DOCUMENTS

| 5,484,227 | A | 1/1996 | Ikeda et al. | |
|---|---|---|---|---|
| 8,294,884 | B2* | 10/2012 | Buehlmann | E01C 19/004 |
| | | | | 356/124 |
| 9,181,660 | B2* | 11/2015 | Fritz | B60W 10/20 |
| 10,435,066 | B2* | 10/2019 | Buschmann | E01C 19/22 |

(Continued)

FOREIGN PATENT DOCUMENTS

| EP | 3276079 | 1/2018 |
|---|---|---|
| JP | H04-077608 U | 7/1992 |

(Continued)

OTHER PUBLICATIONS

International Search Report for PCT/JP2020/013077 mailed on Jun. 9, 2020.

*Primary Examiner* — Raymond W Addie
(74) *Attorney, Agent, or Firm* — IPUSA, PLLC

(57) ABSTRACT

An asphalt finisher includes a tractor, a hopper disposed in front of the tractor and configured to receive a pavement material, a conveyor configured to convey the pavement material in the hopper to a rear side of the tractor, a screw configured to spread the pavement material conveyed by the conveyor at the rear side of the tractor, a screed configured to compact the pavement material spread by the screw at a rear side of the screw, an information acquisition device configured to obtain information on a road to be paved, and a control device. The control device is configured to support an operation of aligning the center of the tractor with the center of a pavement target area based on the information obtained by the information acquisition device.

6 Claims, 13 Drawing Sheets

(56) References Cited

U.S. PATENT DOCUMENTS

| | | | |
|---|---|---|---|
| 2011/0150572 A1* | 6/2011 | Fritz | E01C 23/127 |
| | | | 404/72 |
| 2017/0044726 A1* | 2/2017 | Buschmann | E01C 19/004 |
| 2018/0030672 A1* | 2/2018 | Marsolek | E01C 23/07 |
| 2019/0061753 A1* | 2/2019 | Tanaka | G01C 21/30 |
| 2019/0078275 A1 | 3/2019 | Shelstad et al. | |
| 2019/0283583 A1* | 9/2019 | Buschmann | B60K 35/00 |

FOREIGN PATENT DOCUMENTS

| | | |
|---|---|---|
| JP | H05-083804 U | 11/1993 |
| JP | H06-021924 Y | 6/1994 |
| JP | H06-294105 | 10/1994 |
| JP | H10-037124 | 2/1998 |
| JP | H11-350418 | 12/1999 |
| JP | 2017-160636 | 9/2017 |
| JP | 2018-118593 | 8/2018 |
| WO | 2019/031318 | 2/2019 |

* cited by examiner

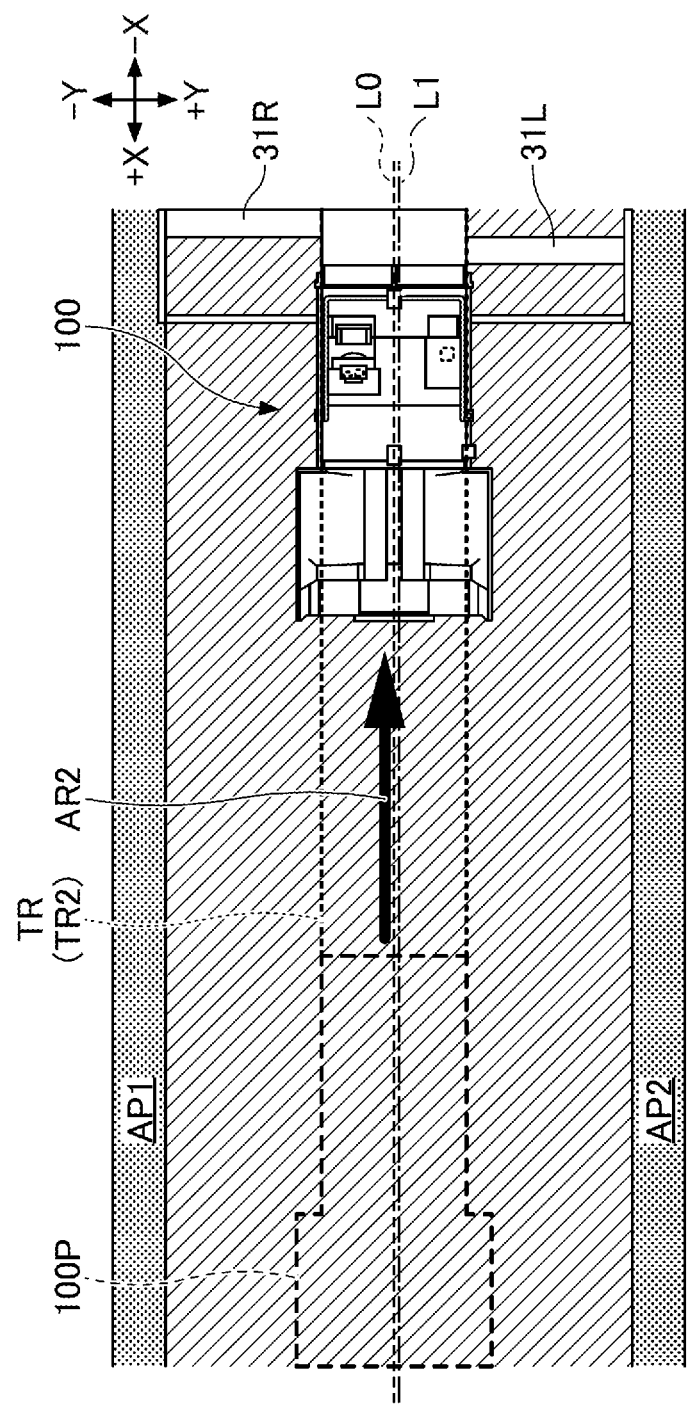

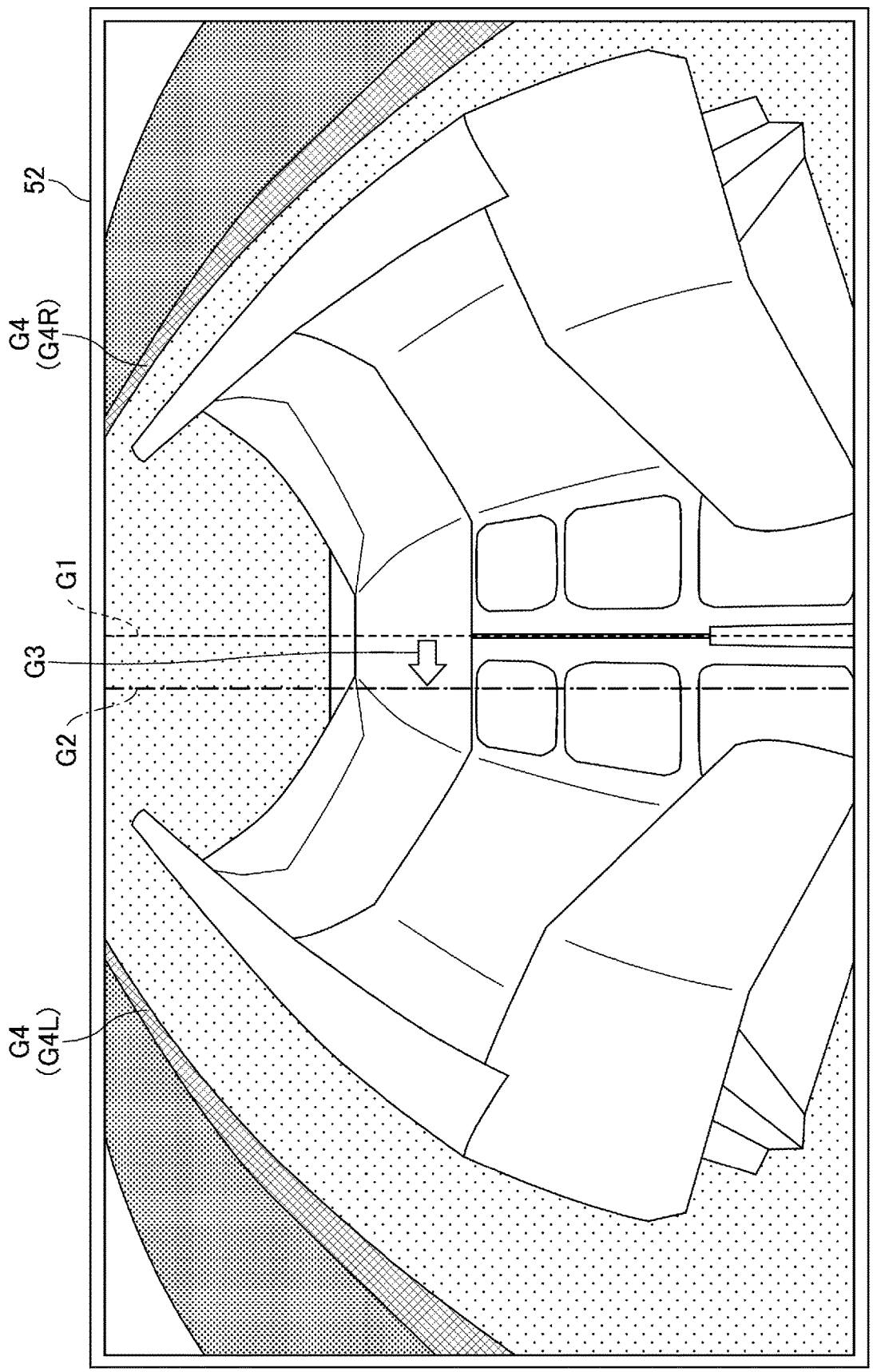

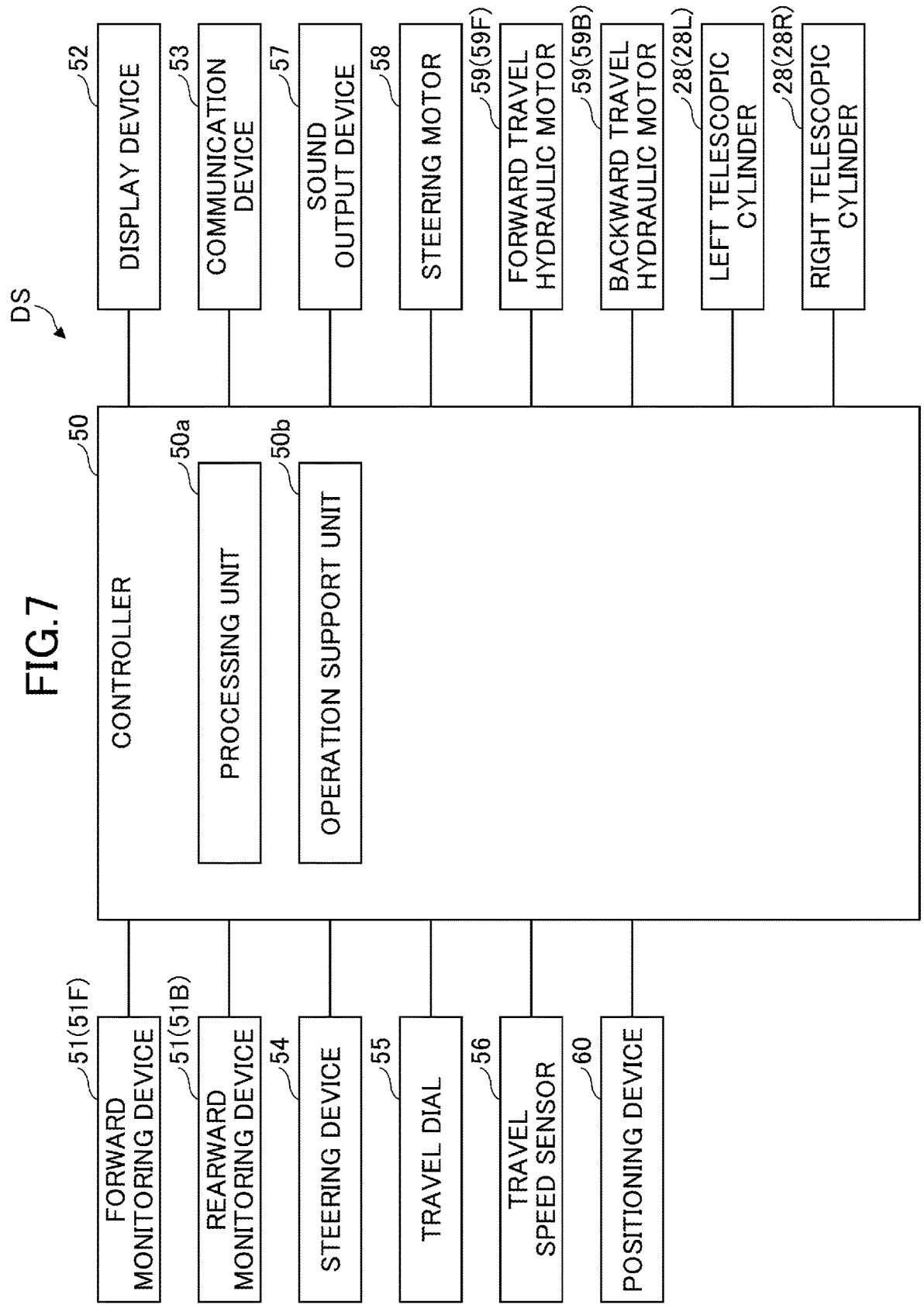

ASPHALT FINISHER

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2020/013077, filed on Mar. 24, 2020, which is based on and claims priority to Japanese Patent Application No. 2019-057339 filed on Mar. 25, 2019, the entire contents of which are incorporated herein by reference.

BACKGROUND OF THE INVENTION

1. Field of the Invention

An aspect of this disclosure relates to an asphalt finisher.

2. Description of the Related Art

A known asphalt finisher includes a rear screed that can be extended and retracted in the lateral direction with respect to a front screed. This asphalt finisher can increase the width of a road to be paved by extending the rear screed.

However, with the above-described asphalt finisher, when the machine body is placed in an inappropriate position with respect to an area (hereafter referred to as a "pavement target area") to be paved with a pavement material, the efficiency of pavement work may be reduced. An inappropriate position is, for example, a position near an edge of the pavement target area, i.e., a position shifted from the center of the pavement target area.

For example, when a widened part exists at the left end of a pavement target area in the final part of the pavement target area that extends straight in the traveling direction, and the machine body is placed near the right end of the pavement target area at the start of pavement, the asphalt finisher may not be able to cover the entire area of the widened part and may not be able to pave the edge of the widened part even if the rear screed is fully extended to the left. In this case, the edge that has not been paved by an asphalt finisher 100 needs to be paved manually by a worker. This results in a decrease in the efficiency of pavement work.

For the above reason, it is desired to provide an asphalt finisher that can appropriately position the machine body and thereby improve the efficiency of pavement work.

SUMMARY OF THE INVENTION

An aspect of this disclosure provides an asphalt finisher that includes a tractor, a hopper disposed in front of the tractor and configured to receive a pavement material, a conveyor configured to convey the pavement material in the hopper to a rear side of the tractor, a screw configured to spread the pavement material conveyed by the conveyor at the rear side of the tractor, a screed configured to compact the pavement material spread by the screw at a rear side of the screw, an information acquisition device configured to obtain information on a road to be paved, and a control device. The control device is configured to support an operation of aligning the center of the tractor with the center of a pavement target area based on the information obtained by the information acquisition device.

BRIEF DESCRIPTION OF THE DRAWINGS

FIG. 4C is a top view of the pavement site;

FIG. 5 is a drawing illustrating an example of a screen displayed during a positioning support process;

FIG. 7 is a drawing illustrating another example of a configuration of an operation support system;

DESCRIPTION OF THE PREFERRED EMBODIMENTS

Figure 1:
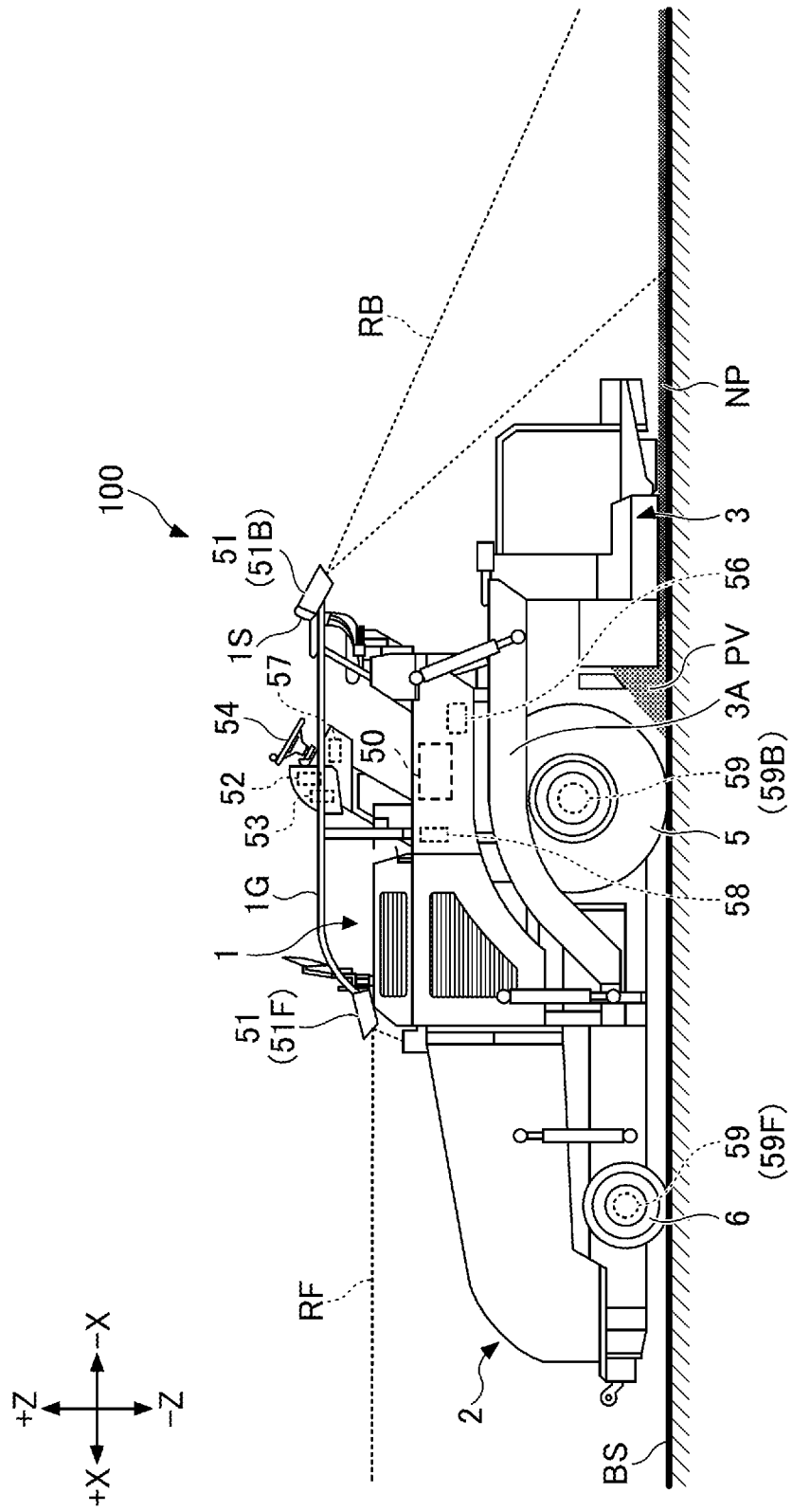
FIG. 1 is a side view of an asphalt finisher according to an embodiment of the present invention.
Figure 2:
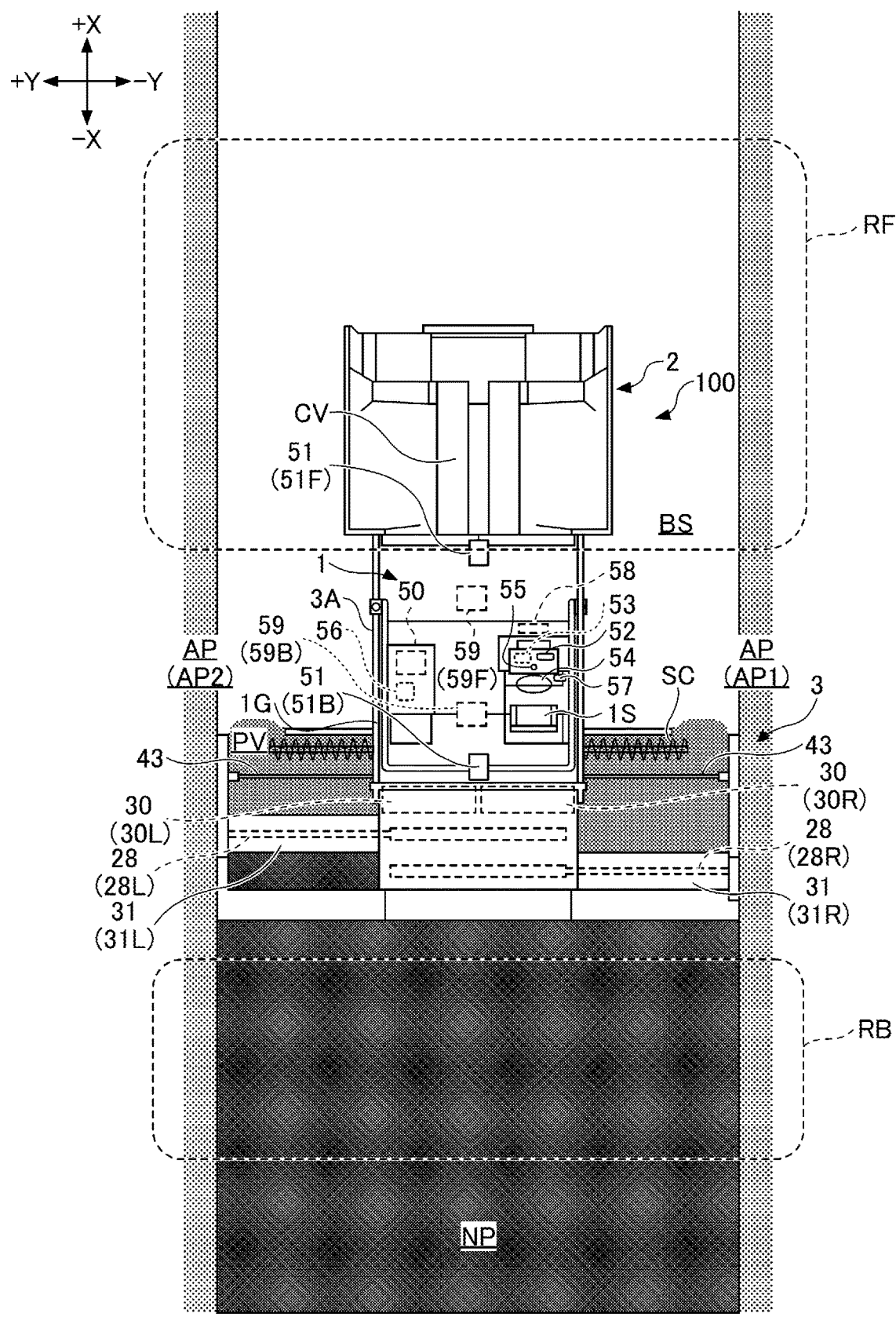
FIG. 2 is a top view of the asphalt finisher of FIG. 1.

FIG. 1 is a side view of an asphalt finisher 100, which is an example of a road machine according to an embodiment of the present invention. FIG. 2 is a top view of the asphalt finisher 100. The asphalt finisher 100 mainly includes a tractor 1, a hopper 2, and a screed 3. In the descriptions below, the direction (+X direction) of the hopper 2 seen from the tractor 1 is referred to as "front", and the direction (−X direction) of the screed 3 seen from the tractor 1 is referred to as "rear". The road machine may also be a base paver, a tack paver, or a multi-asphalt paver.

The tractor 1 is a mechanism for moving the asphalt finisher 100. In the present embodiment, the tractor 1 includes a traveling motor 59 that includes a backward travel hydraulic motor 59B and a forward travel hydraulic motor 59F. Specifically, the tractor 1 uses the backward travel hydraulic motor 59B to rotate rear wheels 5 and uses the forward travel hydraulic motor 59F to rotate front wheels 6 to move the asphalt finisher 100. The backward travel hydraulic motor 59B and the forward travel hydraulic motor 59F are rotated by a hydraulic oil supplied from a hydraulic pump. The rear wheels 5 and the front wheels 6 may be replaced by crawlers. The travel motors may be replaced with electric motors.

A controller 50 is a control device that controls the asphalt finisher 100. In the present embodiment, the controller 50 includes a microcomputer including a CPU, a volatile storage device, and a non-volatile storage device, and is provided in the tractor 1. Functions of the controller 50 are implemented by executing programs stored in the non-volatile storage device with the CPU. Alternatively, functions of the controller 50 may be implemented by hardware or firmware.

The hopper 2 is a mechanism for receiving a pavement material. In the present embodiment, the hopper 2 is disposed in front of the tractor 1 and is configured to be opened and closed in the vehicle width direction (Y-axis direction) by a hopper cylinder. The asphalt finisher 100 normally receives a pavement material from the back of a dump truck with the hopper 2 fully opened. The pavement material is, for example, an asphalt mixture. The dump truck is an example of a transport vehicle that carries a pavement material. FIGS. 1 and 2 illustrate a state where the hopper 2 is fully opened. An operator of the asphalt finisher 100 normally closes the hopper 2 when the pavement material in the hopper 2 decreases to gather the pavement material near the inner wall of the hopper 2 to the central portion of the hopper 2. This is to enable a conveyor CV in the center of the hopper 2 to convey the pavement material to the rear side of the tractor 1. The pavement material conveyed to the rear side of the tractor 1 is spread by a screw SC in the vehicle width direction at a position behind the tractor 1 and in front of the screed 3. In the present embodiment, the screw SC is in a state where extension screws are arranged in the lateral direction and connected to each other.

The screed 3 is a mechanism for leveling a pavement material PV. In the present embodiment, as illustrated in FIG. 2, the screed 3 includes a front screed 30 and a rear screed 31. The front screed 30 includes a left front screed 30L and a right front screed 30R. The rear screed 31 includes a left rear screed 31L and a right rear screed 31R. The screed 3 is a floating screed towed by the tractor 1 and is connected to the tractor 1 via a leveling arm 3A.

In the present embodiment, the rear screed 31 is configured to be extended and retracted in the vehicle width direction by a telescopic cylinder 28.
Specifically, the left rear screed 31L is extended and retracted in the vehicle width direction by a left telescopic cylinder 28L, and the right rear screed 31R is extended and retracted in the vehicle width direction by a right telescopic cylinder 28R. That is, the left rear screed 31L and the right rear screed 31R can be extended and retracted independently of each other. Alternatively, the rear screed 31 may be a detachable fixed (non-extendable) screed that is attached with, for example, a crane when the rear screed 31 is used. Also, the rear screed 31 may be a multi-stage telescopic screed such as a two-stage telescopic screed.

A mold board 43 is attached to the front side of the screed 3. The mold board 43 is configured to be able to adjust the amount of the pavement material PV that is retained in front of the screed 3. The pavement material PV passes through a gap between the lower end of the mold board 43 and a roadbed BS and reaches a position in front of the rear screed 31.

The information acquisition device 51 is attached to the tractor 1. The information acquisition device 51 is configured to obtain information on the pavement of a road and output the obtained information to the controller 50. The information on the pavement of a road includes at least one of information on a new pavement, information on an unpaved body, and information on an environment (e.g., weather). In the present embodiment, the information acquisition device 51 includes a forward monitoring device 51F and a rearward monitoring device 51B.

The forward monitoring device 51F is configured to monitor a space in front of the asphalt finisher 100. In the present embodiment, the forward monitoring device 51F is a camera whose monitoring range RF is a space in front of the tractor 1, and is attached to the center of the front end of the upper surface of the tractor 1. However, the forward monitoring device 51F may be attached to another part of the asphalt finisher 100 to be able to monitor the space in front of the asphalt finisher 100.

The rearward monitoring device 51B is configured to monitor a space behind the asphalt finisher 100. In the present embodiment, the rearward monitoring device 51B is a camera whose monitoring range RB is a space behind the screed 3, and is attached to a guide rail 1G that functions as a handrail for the operator of the asphalt finisher 100. Alternatively, the rearward monitoring device 51B may be attached to a lower part of a driving seat 1S or to any other part of the asphalt finisher 100 to be able to monitor the space behind the asphalt finisher 100.

At least one of the forward monitoring device 51F and the rearward monitoring device 51B may be a device such as a LIDAR, a stereo camera, a laser radar, a millimeter wave radar, a laser scanner, a range imaging camera, or a laser range finder, or may be a combination of the device and a camera.

The monitoring range RF of the forward monitoring device 51F preferably includes a space inside of the hopper 2 and a space in front of the hopper 2. The space in front of the hopper 2 preferably includes the roadbed BS and a feature AP outside of the roadbed BS. This is to make it possible to obtain the height (depth) of the surface of the roadbed BS with respect to a predetermined point on the feature AP that is not covered by a new pavement NP even after the roadbed BS is paved with the new pavement NP. This also makes it possible to obtain the width of the roadbed BS as a pavement target area. In the present embodiment, the monitoring range RF has a width greater than the width of the roadbed BS that is a pavement target area. The feature AP is a curb. The feature AP may also be any feature other than a curb, such as an existing pavement, an L-shaped gutter block, or a wooden frame, as long as it can be used to identify the width of a pavement target area.

The monitoring range RB of the rearward monitoring device 51B preferably includes the new pavement NP and a feature AP outside of the new pavement NP. This is to make it possible to obtain the height of the surface of the new pavement NP with respect to a predetermined point on the feature AP that is not covered by the new pavement NP. In the present embodiment, the monitoring range RB has a width greater than the width of the new pavement NP.

The forward monitoring device 51F may include a positioning device and an inertial measurement unit. This is to detect the position and the orientation of the forward monitoring device 51F. The positioning device is, for example, a GNSS receiver. The same applies to the rearward monitoring device 51B.

The information acquisition device 51 may include a positioning device configured to detect the position of the asphalt finisher 100, a steering angle sensor configured to detect the steering angle of the asphalt finisher 100, and a pavement width sensor configured to detect the amount of extension of the rear screed 31 and thereby calculate a pavement width.

A display device 52 is configured to display information about the asphalt finisher 100. In the present embodiment, the display device 52 is a liquid crystal display disposed in front of the driving seat 1S. Alternatively, the display device 52 may be provided on at least one of the left end portion and the right end portion of the screed 3.

A communication device 53 is configured to be able to control communications between the asphalt finisher 100 and devices outside of the asphalt finisher 100. In the present embodiment, the communication device 53 is disposed in front of the driving seat 1S and is configured to control communications via, for example, a mobile phone communication network, a short-range wireless communication network, or a satellite communication network.

A steering device 54 is an input device used for steering the asphalt finisher 100. In the present embodiment, the steering device 54 is a steering wheel disposed in front of the driving seat 1S. Alternatively, the steering device 54 may be a steering lever disposed in front of the driving seat 1S. When the asphalt finisher 100 includes a crawler as a traveling device, the asphalt finisher 100 typically includes a steering lever as the steering device 54.

A travel dial 55 is an input device used to adjust the moving speed of the asphalt finisher 100. In the present embodiment, the travel dial 55 is implemented by a potentiometer and disposed in front of the driving seat 1S.

Alternatively, the moving speed of the asphalt finisher 100 may be adjusted by a travel lever implemented by a single-axis lever.

A traveling speed sensor 56 is configured to detect the traveling speed of the asphalt finisher 100. In the present embodiment, the traveling speed sensor 56 is a wheel speed sensor, and is configured to be able to detect the rotational angular velocity and the rotational angle of the rear wheels 5 and thereby detect the traveling speed and the travel distance of the asphalt finisher 100.

A sound output device 57 is configured to be able to auditorily output information about the asphalt finisher 100. In the present embodiment, the sound output device 57 is a speaker disposed in front of the driving seat 1S.

A steering motor 58 is configured to assist the manual operation of the steering device 54 by the operator. The steering motor 58 may be configured to be able to drive the steering device 54 regardless of whether there is a manual operation by the operator. In the present embodiment, the steering motor 58 is a hydraulic motor (orbit motor) that is driven by a hydraulic oil discharged from a hydraulic pump. Specifically, the hydraulic motor changes the steering angle of the front wheels by extending and retracting a pair of right and left hydraulic cylinders provided on the axles of the front wheels. The steering device 54 may also be a steering switch implemented by a push button that can open and close two switching valves provided in conduits connecting the hydraulic motor and the pair of right and left hydraulic cylinders. In this case, the operator can change the steering angle by pressing the steering switch.

Alternatively, the steering motor 58 may be an electric motor that is driven in response to a manual operation of the steering device 54 by the operator or in response to a control command from the controller 50.

Also, the steering of the asphalt finisher 100 may be implemented by making the rotation speed of the left wheel or crawler and the rotation speed of the right wheel or crawler different from each other.

Figure 3:
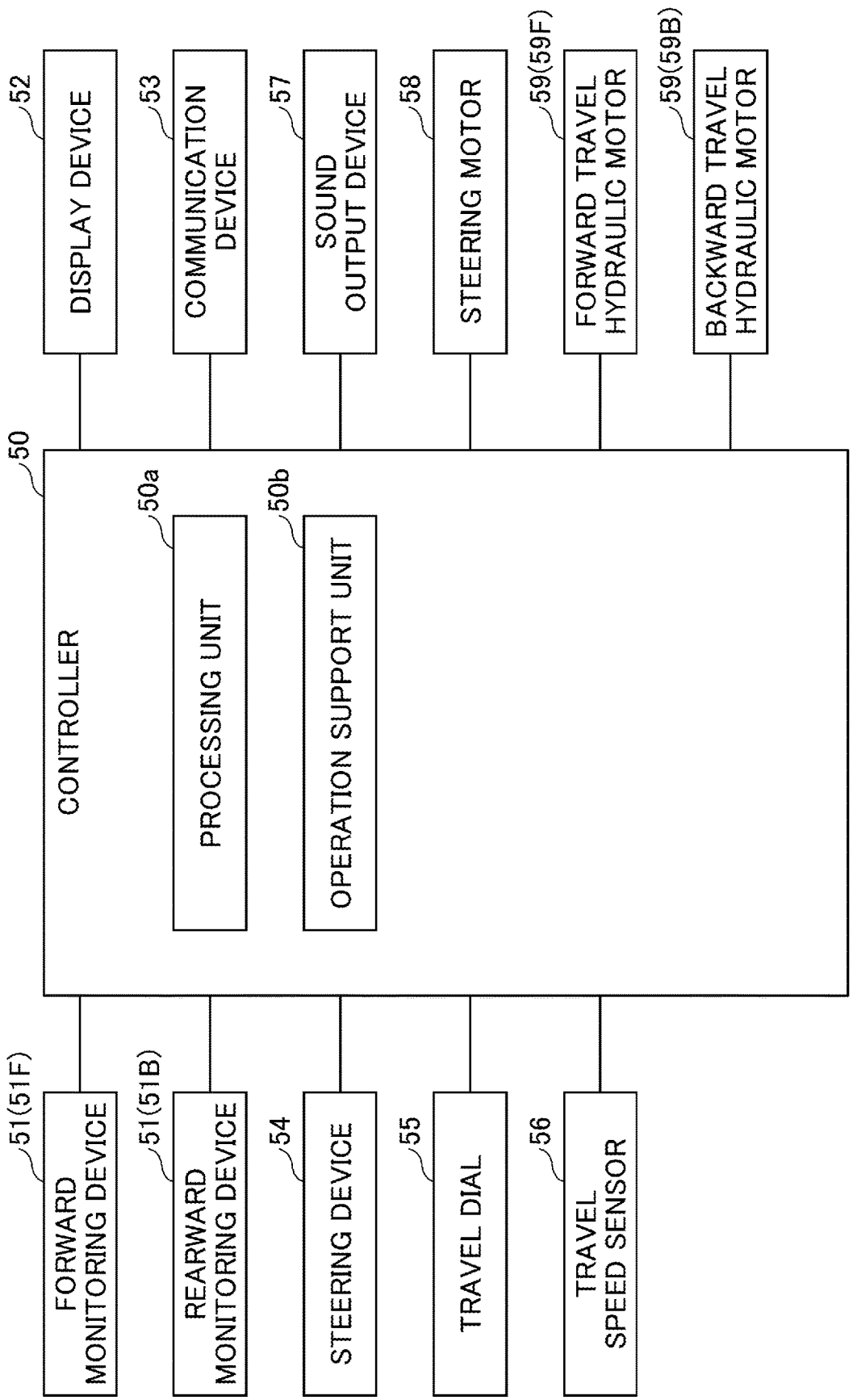
FIG. 3 is a drawing illustrating an example of a configuration of an operation support system.

Next, with reference to FIG. 3, an example of a configuration of an operation support system DS provided in the asphalt finisher 100 is described. FIG. 3 is a drawing illustrating an example of a configuration of the operation support system DS.

The operation support system DS mainly includes the controller 50, the forward monitoring device 51F, the rearward monitoring device 51B, the display device 52, the communication device 53, the steering device 54, the travel dial 55, the traveling speed sensor 56, the sound output device 57, the steering motor 58, the forward travel hydraulic motor 59F, and the backward travel hydraulic motor 59B. The controller 50 includes a processing unit 50a and an operation support unit 50b as functional components that implement a part of the functions of the asphalt finisher 100. Although the processing unit 50a and the operation support unit 50b are illustrated as separate components for explanation purposes, they do not need to be physically separated and may be entirely or partially implemented by a common software component or hardware component.

The processing unit 50a is configured to derive information used to control the asphalt finisher 100. In the present embodiment, the processing unit 50a is configured to be able to derive the position of a center line of a pavement target area.

For example, the processing unit 50a detects a feature AP (see FIG. 2) that defines the boundary of the roadbed BS (see FIG. 2), which is a pavement target area, based on an output from the forward monitoring device 51F. Specifically, the processing unit 50a detects a right feature AP1 that defines the right (−Y side) boundary of the roadbed BS and a left feature AP2 that defines the left (+Y side) boundary of the roadbed BS. Next, the processing unit 50a calculates a distance in the vehicle width direction (Y-axis direction) between the right feature AP1 and the left feature AP2 as the width of the roadbed BS, which is a pavement target area. Then, the processing unit 50a derives a line passing through the center of the roadbed BS with the calculated width as the center line of the pavement target area.

Also, the processing unit 50a is configured to be able to derive the position of the center line of the machine body of the asphalt finisher 100. In the present embodiment, the center line of the machine body of the asphalt finisher 100 is the center line of the tractor 1.

The processing unit 50a detects the internal shape of the hopper 2 based on, for example, an output of the forward monitoring device 51F whose monitoring range includes the internal space of the hopper 2. Then, the processing unit 50a derives the center line of the hopper 2 as the center line of the tractor 1 based on the detected internal shape of the hopper 2.

In the present embodiment, the processing unit 50a uses a local coordinate system centered on a camera implementing the forward monitoring device 51F to indicate the position of the center line of the pavement target area and the position of the center line of the tractor 1. Specifically, the processing unit 50a uses two or more coordinate points in the local coordinate system to indicate each of the position of the center line of the pavement target area and the position of the center line of the tractor 1.

The operation support unit 50b is configured to support the operation of the asphalt finisher 100 by the operator. In the present embodiment, the operation support unit 50b presents to the operator the relationship between the center line of the pavement target area and the center line of the tractor 1 derived by the processing unit 50a to support the positioning operation of the asphalt finisher 100 by the operator.

The positioning operation of the asphalt finisher 100 is an operation for placing the asphalt finisher 100 in an appropriate position with respect to the pavement target area before pavement work is started. This positioning operation typically involves steering with the steering device 54 and moving the asphalt finisher 100 with the travel dial 55.

In the present embodiment, the operation support unit 50b displays an image (hereafter referred to as a "camera image") captured by the camera used as the forward monitoring device 51F on the display device 52. Then, the operation support unit 50b superimposes a figure (line image) representing the center line of the pavement target area and a figure (line image) representing the center line of the tractor 1 on the camera image. This is to enable the operator to intuitively recognize the amount of misalignment (hereafter referred to as a "center misalignment") between the center line of the pavement target area and the center line of the tractor 1. This also enables the operator to intuitively recognize whether the center line of the pavement target area exists on the right side of the center line of the tractor 1 or on the left side of the center line of the tractor 1.

The operation support unit 50b may be configured to auditorily support the positioning operation of the asphalt finisher 100 by the operator. For example, the operation support unit 50b may cause the sound output device 57 to output an intermittent sound corresponding to the amount of the center misalignment. In this case, the operation support unit 50b may increase the interval of the intermittent sound as the amount of the center misalignment increases. Also, the operation support unit 50*b* may output a continuous sound when the amount of the center misalignment becomes zero, i.e., when the center line of the pavement target area is aligned with the center line of the tractor 1.

The operation support unit 50*b* may autonomously or semi-autonomously move the asphalt finisher 100 such that the center line of the pavement target area is aligned with the center line of the tractor 1. The autonomous movement indicates moving the asphalt finisher 100 independently of the manual operation by the operator. The semi-autonomous movement indicates moving the asphalt finisher 100 by a combination of a manual operation by the operator and an automatic operation by the controller 50. For example, the semi-autonomous movement includes moving the asphalt finisher 100 by a combination of a manual operation of the travel dial 55 by the operator and an automatic operation of the steering device 54 by the controller 50.

When autonomous or semi-autonomous movement is performed, the processing unit 50*a* may derive a target trajectory based on the position of the center line of the pavement target area and the position of the center line of the tractor 1. The target trajectory is a path that the asphalt finisher 100 follows when the operation support unit 50*b* moves the asphalt finisher 100 autonomously or semi-autonomously.

The operation support unit 50*b* realizes an autonomous movement or a semi-autonomous movement of the asphalt finisher 100 by driving at least one of the steering motor 58, the forward travel hydraulic motor 59F, and the backward travel hydraulic motor 59B.

Figure 4A:
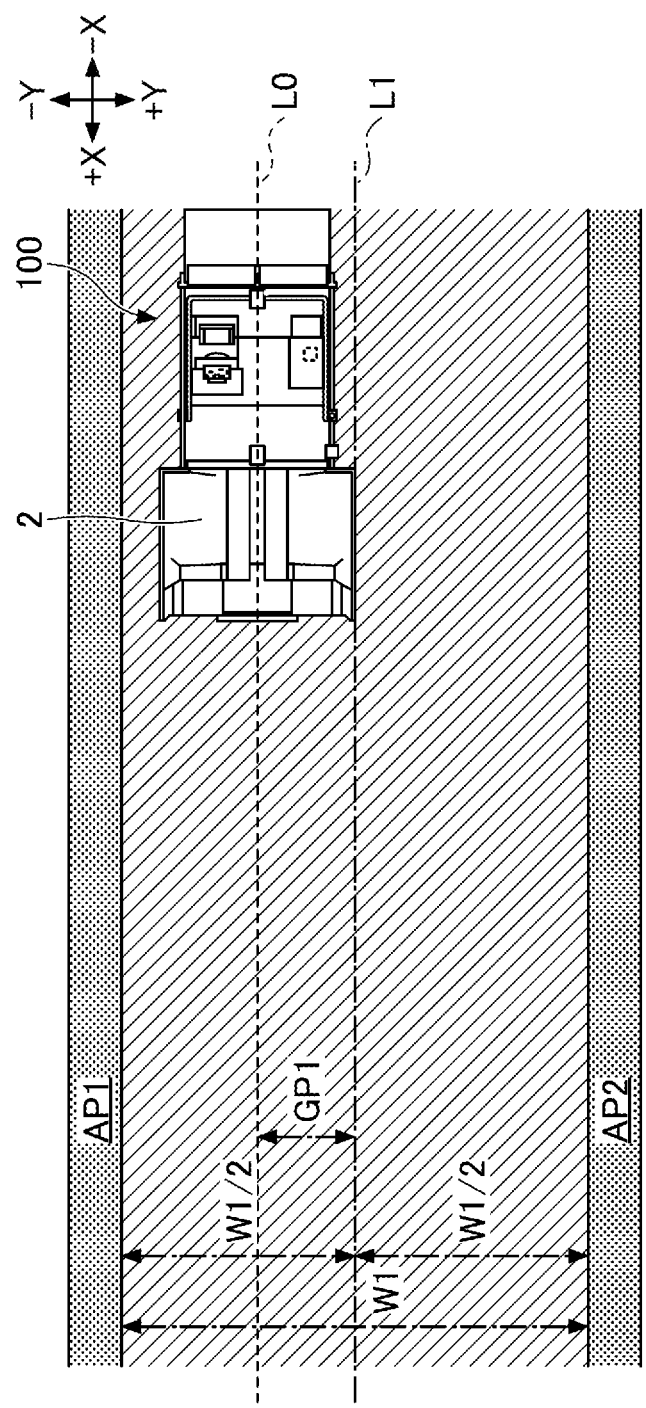
FIG. 4A is a top view of a pavement site.
Figure 4B:
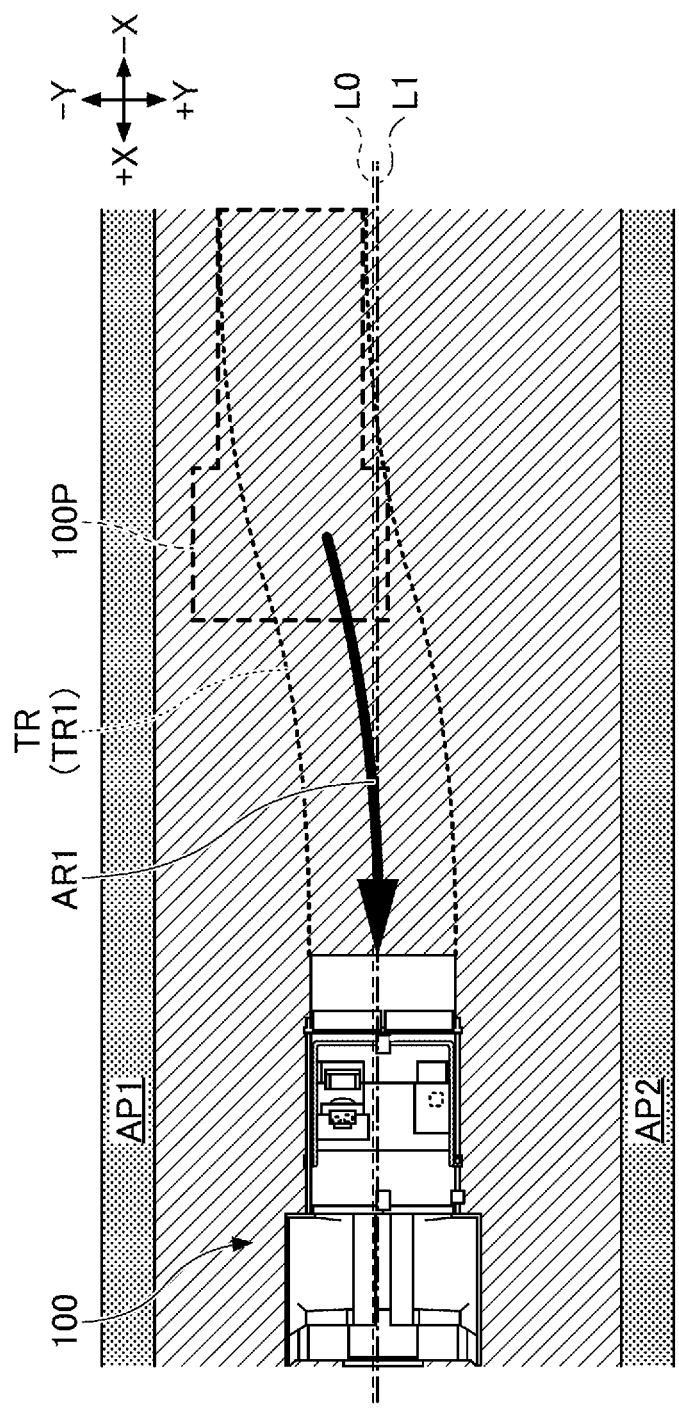
FIG. 4B is a top view of the pavement site.

Next, with reference to FIGS. 4A, 4B, 4C, and 5, a specific example of a process (hereafter referred to as a "positioning support process") in which the controller 50 supports the positioning operation of the asphalt finisher 100 is described. FIGS. 4A to 4C are top views of a pavement site. FIG. 5 is an example of a screen displayed on the display device 52 while the positioning support process is performed.

Specifically, FIG. 4A illustrates a state of the pavement site before the positioning support process is started. The positioning support process is started, for example, when a predetermined button is pressed. FIG. 4B illustrates a state of the pavement site when the asphalt finisher 100 autonomously moves forward in response to the start of the positioning support process and the center line of the pavement target area is aligned with the center line of the tractor 1. FIG. 4C illustrates a state of the pavement site when the asphalt finisher 100 autonomously moves backward to a pavement work start position. In FIGS. 4A to 4C, the pavement target area is indicated by diagonal hatching.

First, when a predetermined button is pressed, the controller 50 starts the positioning support process. Specifically, as illustrated in FIG. 4, the processing unit 50*a* of the controller 50 detects the internal shape of the hopper 2 based on an output of the forward monitoring device 51F whose monitoring range RF includes the internal space of the hopper 2. Then, the processing unit 50*a* derives the center line of the hopper 2 as a center line L0 of the tractor 1 based on the detected internal shape of the hopper 2.

Based on the output of the forward monitoring device 51F, the processing unit 50*a* detects a right feature AP1 that defines the right side (−Y side) boundary of the pavement target area and a left feature AP2 that defines the left side (+Y side) boundary of the pavement target area. Next, the processing unit 50*a* calculates a width W1, which is the distance in the vehicle width direction (Y-axis direction) between the right feature AP1 and the left feature AP2, as the width of the pavement target area. Then, the processing unit 50*a* derives a line passing through the center of the pavement target area having the calculated width W1 as a center line L1 of the pavement target area. That is, the processing unit 50*a* sets the center line L1 at a position that is at a distance W1/2 from the feature AP1 and a distance W1/2 from the feature AP2.

In this way, the processing unit 50*a* calculates a center misalignment value GP1 after deriving the center line L0 of the tractor 1 and the center line L1 of the pavement target area.

At this stage, as illustrated in FIG. 5, the operation support unit 50*b* causes the display device 52 to display the relationship between the center line L0 of the tractor 1 and the center line L1 of the pavement target area. The screen illustrated in FIG. 5 includes figures G1 through G4. In the example illustrated in FIG. 5, the figures G1 through G4 are superimposed on the camera image. The figure G1 is a line segment representing the center line L0 of the tractor 1. The figure G2 is a line segment representing the center line L1 of the pavement target area. The figure G3 is an arrow that indicates the amount of the center misalignment. The length of the arrow corresponds to the amount of the center misalignment. The left-pointing arrow indicates that the center line L1 of the pavement target area exists on the left side of the center line L0 of the tractor 1. The operation support unit 50*b* may display the center misalignment value GP1 together with the arrow. The figures G4 emphasize the feature AP1 and the feature AP2 detected by the processing unit 50*a* when deriving the center line L1 of the pavement target area. By looking at the figures G4, the operator can determine whether the center line L1 of the pavement target area has been properly derived.

Next, the processing unit 50*a* derives the target trajectory TR based on the calculated center misalignment value GP1. In the present embodiment, target trajectories TR include a target trajectory TR1 used when moving the asphalt finisher 100 forward as illustrated in FIG. 4B and a target trajectory TR2 used when moving the asphalt finisher 100 backward as illustrated in FIG. 4C. In the present embodiment, the target trajectories TR are set as trajectories followed by the rear wheels 5 of the asphalt finisher 100.

The operation support unit 50*b* drives the steering motor 58, the forward travel hydraulic motor 59F, and the backward travel hydraulic motor 59B to move the asphalt finisher 100 forward as indicated by an arrow AR1 along the target trajectory TR1 indicated by bold dotted lines in FIG. 4B. An area 100P surrounded by a broken line in FIG. 4B indicates the position of the asphalt finisher 100 before the forward movement of the asphalt finisher 100 is started. In this example, the operation support unit 50*b* moves the asphalt finisher 100 forward until the center line L0 of the tractor 1 is aligned with the center line L1 of the pavement target area.

Next, the operation support unit 50*b* drives the steering motor 58, the forward travel hydraulic motor 59F, and the backward travel hydraulic motor 59B to move the asphalt finisher 100 backward as indicated by an arrow AR2 along the target trajectory TR2 indicated by bold dotted lines in FIG. 4C. An area 100*p* surrounded by a broken line in FIG. 4C indicates the position of the asphalt finisher 100 before the backward movement of the asphalt finisher 100 is started. In this example, the operation support unit 50*b* moves the asphalt finisher 100 backward until the asphalt finisher 100 reaches the pavement start position.

Next, the operation support unit 50*b* automatically extends the telescopic cylinder 28, while monitoring an output of the pavement width sensor, to match the width of the pavement target area. FIG. 4C illustrates the asphalt finisher 100 in a state where the rear screed 31 is extended to match the width of the pavement target area. In this example, the operation support unit 50b can make the amount of extension of the left rear screed 31L substantially match the amount of extension of the right rear screed 31R.

As described above, the controller 50 can automatically place the asphalt finisher 100 in an appropriate position when starting the pavement work by performing the positioning support process. Thereafter, the asphalt finisher 100 receives a pavement material into the hopper 2, supplies the pavement material to the rear side of the tractor 1 with the conveyor CV, spreads the pavement material in the vehicle width direction with the screw SC, and then starts moving forward for pavement.

Figure 6A:
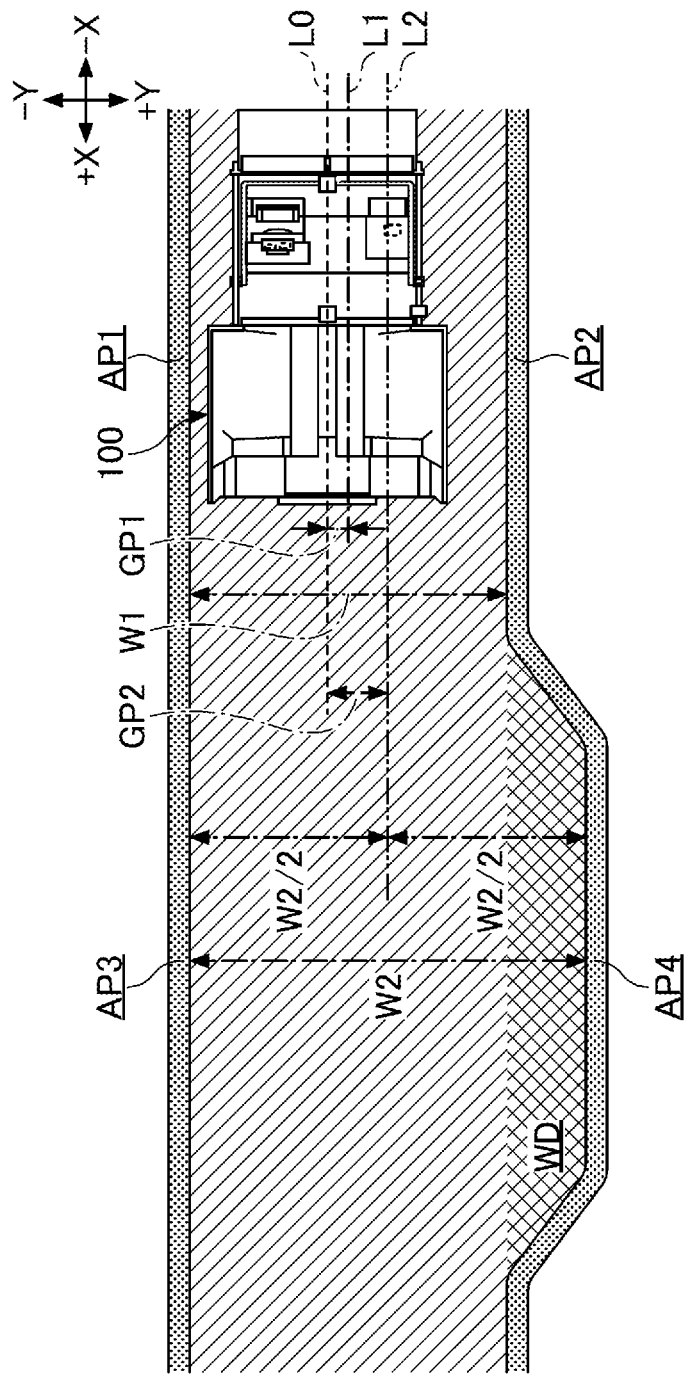
FIG. 6A is a top view of another pavement site.
Figure 6B:
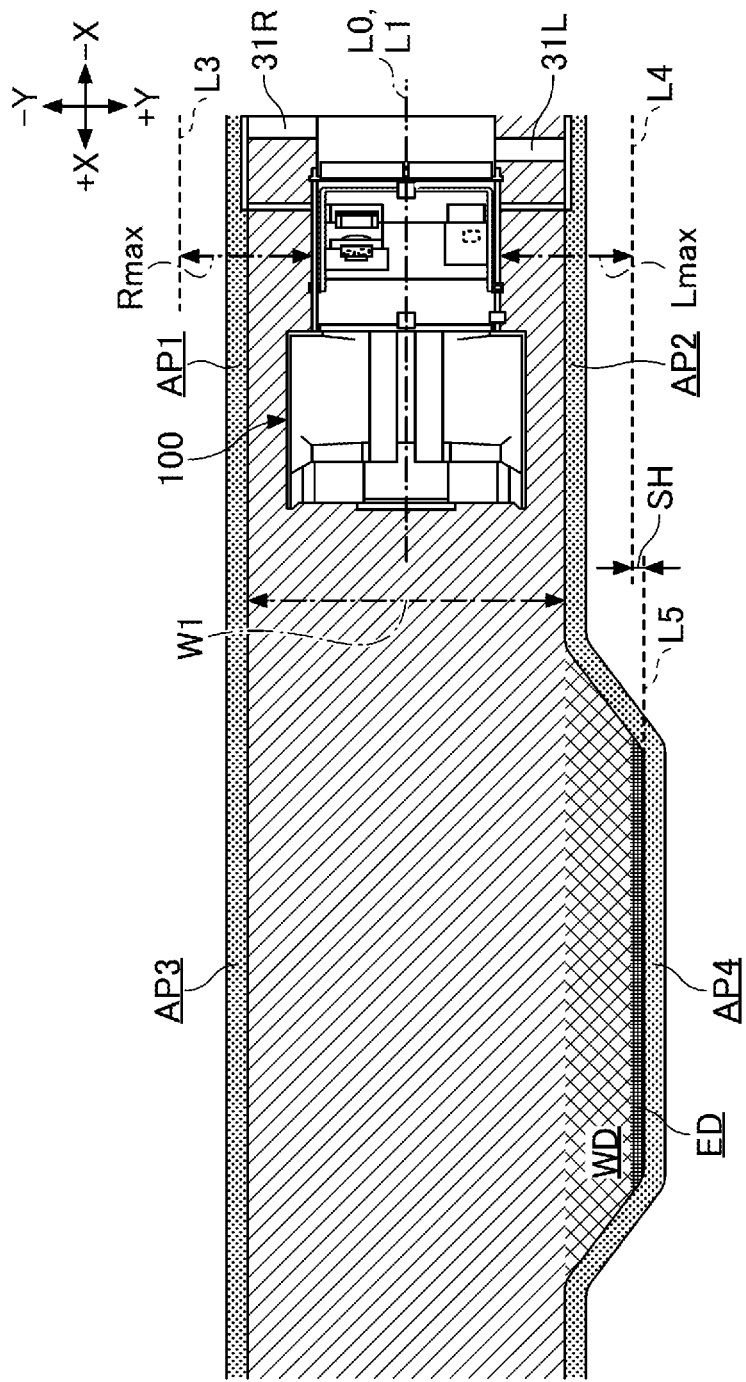
FIG. 6B is a top view of another pavement site.
Figure 6C:
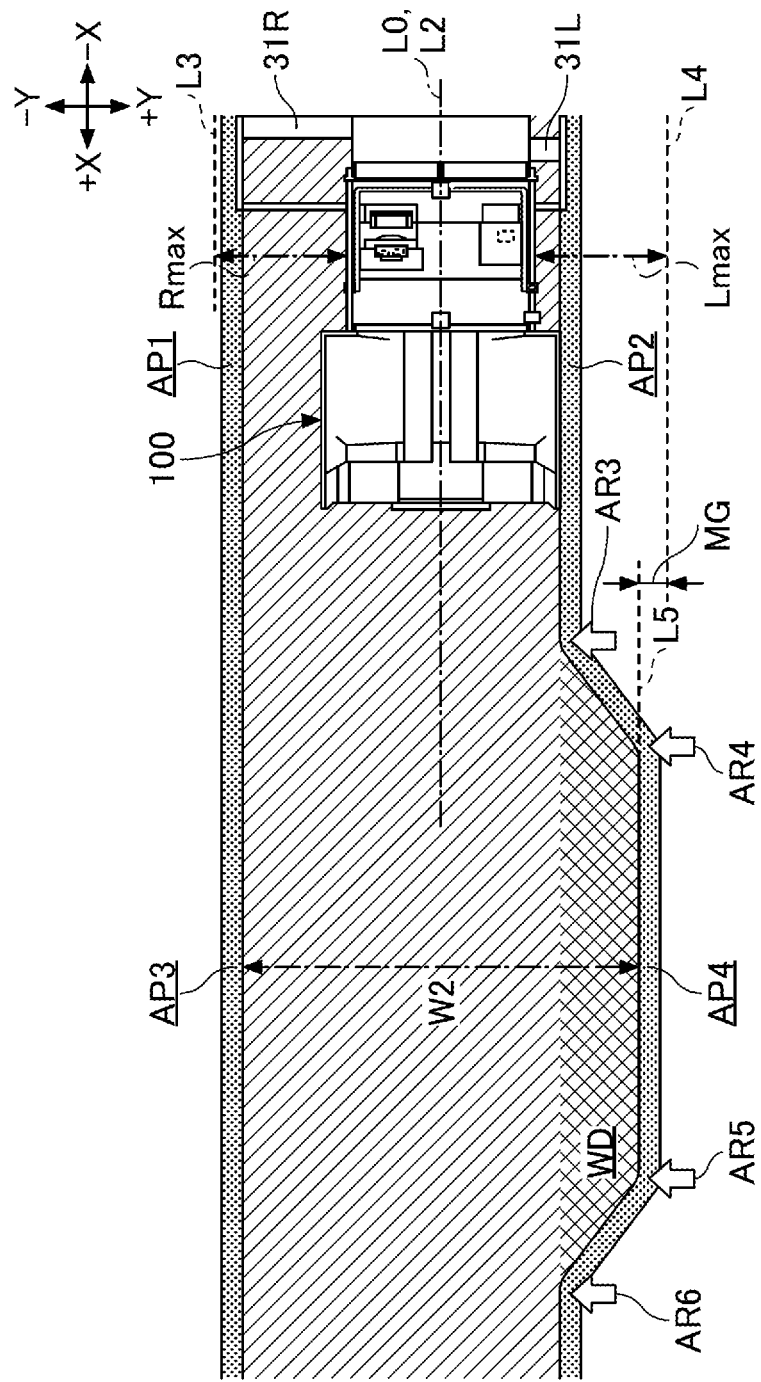
FIG. 6C is a top view of another pavement site.

Next, another specific example of the positioning support process is described with reference to FIGS. 6A to 6C. FIGS. 6A to 6C are top views of the pavement site. In the example illustrated in FIGS. 6A to 6C, the pavement target area includes a widened part WD. In FIGS. 6A to 6C, the widened part WD is indicated by cross-hatching. The widened part WD is formed, for example, at the position of a bus stop.

When a predetermined button is pressed, the controller 50 starts the positioning support process. The method of deriving the center line L0 of the tractor 1, the method of calculating the width W1 of the pavement target area not including the widened part WD, and the method of deriving the center line L1 of the pavement target area not including the widened part WD are the same as those described with reference to FIGS. 4A to 4C.

In the example of FIGS. 6A to 6C, the controller 50 aligns the center line L0 of the tractor 1 with a center line L2 of the pavement target area including the widened part WD instead of the center line L1 of the pavement target area not including the widened part WD.

As illustrated in FIG. 6A, based on an output of the forward monitoring device 51F, the processing unit 50a detects a right feature AP3 that defines the right (−Y side) boundary of the pavement target area including the widened part WD and a left feature AP4 that defines the left (+Y side) boundary of the pavement target area including the widened part WD. Next, the processing unit 50a calculates a width W2, which is the distance in the vehicle width direction (Y-axis direction) between the right feature AP3 and the left feature AP4, as the width of the pavement target area including the widened part WD. Then, the processing unit 50a derives a line passing through the center of the pavement target area having the calculated width W2 as the center line L2 of the pavement target area including the widened part WD. That is, the processing unit 50a sets the center line L2 at a position that is at a distance W2/2 from the feature AP3 and a distance W2/2 from the feature AP4.

Next, the processing unit 50a calculates a center misalignment value GP2 after deriving the center line L0 of the tractor 1 and the center line L2 of the pavement target area including the widened part WD. Then, the processing unit 50a derives target trajectories TR based on the calculated center misalignment value GP2.

FIG. 6B illustrates pavement work performed if the controller 50 aligns the center line L0 of the tractor 1 with the center line L1 of the pavement target area with the width W1 not including the widened part WD in the positioning support process.

A broken line L3 in FIG. 6B indicates the right end position of the right rear screed 31R when the right rear screed 31R is fully extended, i.e., the right end position of a right maximum pavement width Rmax. Similarly, a broken line L4 in FIG. 6B indicates the left end position of the left rear screed 31L when the left rear screed 31L is fully extended, i.e., the left end position of a left maximum pavement width Lmax. Also, a broken line L5 in FIG. 6B indicates the left end position of the widened part WD.

As is clear from FIG. 6B, the asphalt finisher 100 cannot pave an edge ED of the widened part WD if the asphalt finisher 100 starts paving in a state where the center line L0 of the tractor 1 is aligned with the center line L1 of the pavement target area. This is because the amount of extension of the left rear screed 31L is insufficient by a distance SH to cover the entire widened part WD even if the asphalt finisher 100 fully extends the left rear screed 31L.

For this reason, in the positioning support process in the example of FIG. 6C, the controller 50 aligns the center line L0 of the tractor 1 with the center line L2 of the pavement target area having the width W2 and including the widened part WD instead of the center line L1 of the pavement target area having the width W1 and not including the widened part WD. That is, in the positioning support process, the controller 50 offsets the position of the asphalt finisher 100 toward the widened part WD in advance to prevent the amount of extension of the left rear screed 31L from becoming insufficient.

FIG. 6C illustrates pavement work performed when, in the positioning support process, the controller 50 aligns the center line L0 of the tractor 1 with the center line L2 of the pavement target area having the width W2 and including the widened part WD.

As is clear from FIG. 6C, the asphalt finisher 100 can pave the edge ED of the widened part WD when paving is started in a state where the center line L0 of the tractor 1 is aligned with the center line L2 of the pavement target area including the widened part WD. This is because the asphalt finisher 100 can extend the left rear screed 31L to a position that is farther than the edge of the widened part WD by a distance MG.

In the example of FIG. 6C, the controller 50 starts extending the left rear screed 31L when the rear end of the left rear screed 31L reaches or comes close to a point indicated by an arrow AR3, and stops extending the left rear screed 31L when the rear end of the left rear screed 31L reaches or comes close to a point indicated by an arrow AR4. Then, the controller 50 starts retracting the left rear screed 31L when the rear end of the left rear screed 31L reaches or comes close to a point indicated by an arrow AR5, and stops retracting the left rear screed 31L when the rear end of the left rear screed 31L reaches or comes close to a point indicated by an arrow AR6.

In the example of FIG. 6C, the controller 50 derives the center line L2 of the pavement target area having the width W2 and including the widened part WD by performing image processing on an image captured by the camera used as the forward monitoring device 51F. However, the controller 50 may be configured to derive the center line L2 based on design data stored in the non-volatile storage device and position information of the asphalt finisher 100 obtained by the positioning device. In this case, the controller 50 can properly derive the center line L2 even when, for example, the widened part WD is in a distant place that cannot be imaged by the camera.

Next, with reference to FIG. 7, another example of the configuration of the operation support system DS provided in the asphalt finisher 100 is described. FIG. 7 is a drawing illustrating an example of a configuration of the operation support system DS.

The operation support system DS of FIG. 7 mainly differs from the operation support system DS of FIG. 3 in that a positioning device 60 that functions as the information acquisition device 51 is added and the operation support unit 50*b* is configured to support the operation of the asphalt finisher 100 by the operator not only in the positioning operation performed before the pavement work is started but also in a pavement operation performed after the pavement work is started. However, the operation support system DS of FIG. 7 is the same as the operation support system DS of FIG. 3 in other aspects. Therefore, below, the descriptions of the common parts are omitted, and different parts are described in detail.

The positioning device 60 is configured to detect the position of the asphalt finisher 100. In the present embodiment, the positioning device 60 is a GNSS receiver. The position of the asphalt finisher 100 is represented using a reference coordinate system. That is, the position of the asphalt finisher 100 is identified by coordinates in the reference coordinate system. The reference coordinate system is, for example, a world geodetic coordinate system. The world geodetic coordinate system is a three-dimensional Cartesian XYZ coordinate system in which the origin is set at the center of gravity of the earth, the X-axis is set in the direction of the intersection between the Greenwich meridian and the equator, the Y-axis is set in the direction of 90 degrees east longitude, and the Z-axis is set in the direction of the North Pole.

Also, in the example of FIG. 7, the controller 50 is configured to obtain information on the pavement target area via, for example, an input device such as a memory card reader or the communication device 53. The information on the pavement target area is, for example, road design data that includes information regarding the width, the entire length, and the shape of the pavement target area as well as the position and the size of the widened part WD. Similarly to the position of the asphalt finisher 100, the information on the pavement target area is expressed using the reference coordinate system.

The operation support unit 50*b* is configured to derive a target trajectory TR, which the center point of the asphalt finisher 100 follows during pavement work, i.e., while the asphalt finisher 100 moves forward, based on the information on the pavement target area.

Then, based on the position of the asphalt finisher 100 detected by the positioning device 60, the operation support unit 50*b* drives at least one of the steering motor 58, the forward travel hydraulic motor 59F, and the backward travel hydraulic motor 59B to move the asphalt finisher 100 along the target trajectory TR.

Also, the operation support unit 50*b* changes the amount of extension of each of the left rear screed 31L and the right rear screed 31R according to the movement of the center line L0 of the tractor 1 in the width direction of the pavement target area. This is to enable the screed 3 to cover the entire width of the pavement target area. Specifically, the operation support unit 50*b* extends and retracts the left telescopic cylinder 28L to change the amount of extension of the left rear screed 31L, and extends and retracts the right telescopic cylinder 28R to change the amount of extension of the right rear screed 31R.

With this configuration, for example, even in a situation as illustrated in FIG. 6B, the operation support unit 50*b* can move the asphalt finisher 100 in the vehicle width direction during pavement work so that the pavement target area including the widened part WD can be properly paved. That is, even in a situation as illustrated in FIG. 6B where the widened part WD cannot be paved by the asphalt finisher 100 continuously moving straight even if the left rear screed 31L is fully extended, the operation support unit 50*b* makes it possible to properly pave the widened part WD by moving the asphalt finisher 100 closer to the left edge of the pavement target area during the pavement work.

Also, the operation support unit 50*b* can move the asphalt finisher 100 closer to the left edge of the pavement target area regardless of the manual operation by the operator and can appropriately change the extension amounts of the right and left rear screeds 31. Therefore, the operator can perform other operations without being bothered by operations for steering the asphalt finisher 100 and extending and retracting the right and left rear screeds 31.

In the example of FIG. 7, the operation support unit 50*b* derives the target trajectory TR based on the information on the pavement target area obtained via the input device or the communication device 53. However, the operation support unit 50*b* may derive the target trajectory TR based on the output of the forward monitoring device 51F.

Also, in the example of FIG. 7, the operation support unit 50*b* is configured to autonomously move the asphalt finisher 100 in the vehicle width direction. However, the operation support unit 50*b* may be configured to support the manual operation performed by the operator to move the asphalt finisher 100 in the vehicle width direction by using at least one of sound, light, and vibration.

Figure 8A:
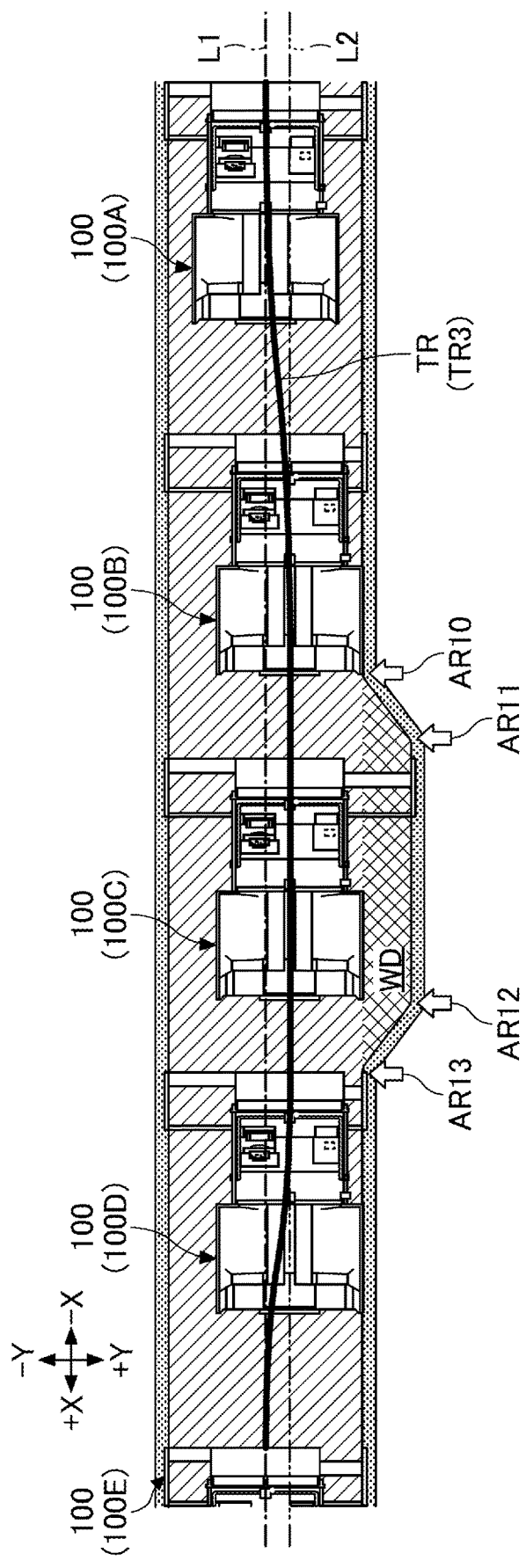
FIG. 8A is a top view of still another pavement site.
Figure 8B:
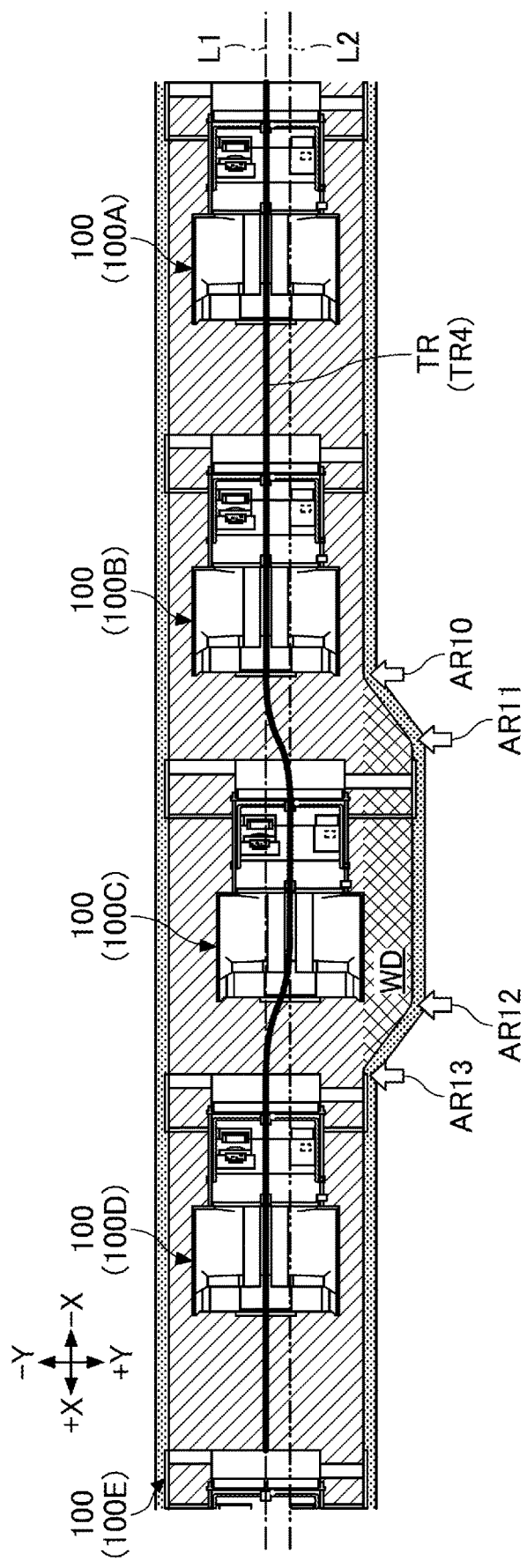
FIG. 8B is a top view of still another pavement site.

Next, with reference to FIGS. 8A and 8B, a specific example of a process (hereafter referred to as a "pavement support process") where the controller 50 supports pavement work performed by the asphalt finisher 100 is described. FIGS. 8A and 8B are top views of a pavement site. Specifically, FIGS. 8A and 8B illustrate pavement work performed when the center line L0 of the tractor 1 is aligned, in the positioning support process, with the center line L1 of the pavement target area having the width W1 and not including the widened part WD. More specifically, FIGS. 8A and 8B illustrate two examples of pavement support processes where the center line L0 of the tractor 1 is moved in the vehicle width direction while changing the extension amounts of the right and left rear screeds 31 during the traveling of the asphalt finisher 100 so that the widened part WD is properly paved.

FIG. 8A illustrates pavement work where the center line L0 of the tractor 1 is moved relatively moderately. FIG. 8B illustrates pavement work where the center line L0 of the tractor 1 is moved relatively quickly.

In each of FIGS. 8A and 8B, the asphalt finisher 100 moves from the −X side to the +X side through points TA, TB, TC, TD, and TE in this order. Also, in FIGS. 8A and 8B, an asphalt finisher 100A indicates the state of the asphalt finisher 100 at the point TA, an asphalt finisher 100B indicates the state of the asphalt finisher 100 at the point TB, an asphalt finisher 100C indicates the state of the asphalt finisher 100 at the point TC, an asphalt finisher 100D indicates the state of the asphalt finisher 100 at the point TD, and an asphalt finisher 100E indicates the state of the asphalt finisher 100 at the point TE.

In the example of FIG. 8A, the operation support unit 50*b* of the controller 50 starts the pavement support process when a predetermined button is pressed and derives a target trajectory TR3.

The target trajectory TR3 is a path followed by the rear-end center part of the front screed 30. The target trajectory TR3 is set such that the rear-end center part of the front screed 30 is located on the center line L1 when the asphalt finisher 100 is located at the point TA, the rear-end center part of the front screed 30 is located on the center line L2 when the asphalt finisher 100 is located at the point TB, and the rear-end center part of the front screed 30 is located on the center line L2 when the asphalt finisher 100 is located at the point TC. Also, the target trajectory TR3 is set such that the rear-end center part of the front screed 30 is located on the center line L2 when the asphalt finisher 100 is located at the point TD, and the rear-end center part of the front screed 30 is located on the center line L1 when the asphalt finisher 100 is located at the point TE.

The controller 50 moves the asphalt finisher 100 such that the rear-end center part of the front screed 30 moves along the target trajectory TR3.

Also, the controller 50 starts retracting the left rear screed 31L and extending the right rear screed 31R when the asphalt finisher 100 is located at the point TA, and stops retracting the left rear screed 31L and extending the right rear screed 31R when the asphalt finisher 100 reaches the point TB.

Then, the controller 50 starts extending the left rear screed 31L when the rear end of the left rear screed 31L reaches or comes close to a point indicated by an arrow AR10, and stops extending the left rear screed 31L when the rear end of the left rear screed 31L reaches or comes close to a point indicated by an arrow AR11. Also, the controller 50 starts retracting the left rear screed 31L when the rear end of the left rear screed 31L reaches or comes close to a point indicated by an arrow AR12, and stops retracting the left rear screed 31L when the rear end of the left rear screed 31L reaches or comes close to a point indicated by an arrow AR13. On the other hand, the controller 50 does not extend or retract the right rear screed 31R until the asphalt finisher 100 reaches the point TD.

Then, the controller 50 starts extending the left rear screed 31L and retracting the right rear screed 31R when the asphalt finisher 100 reaches the point TD, and stops extending the left rear screed 31L and retracting the right rear screed 31R when the asphalt finisher 100 reaches the point TE.

In the example of FIG. 8B, the operation support unit 50b of the controller 50 starts the pavement support process when a predetermined button is pressed, and derives a target trajectory TR4.

The target trajectory TR4 is a path followed by the rear-end center part of the front screed 30. The target trajectory TR4 is set such that the rear-end center part of the front screed 30 remains on the center line L1 until the rear end of the left rear screed 31L reaches a point indicated by an arrow AR10. Also, the target trajectory TR4 is set such that the rear-end center part of the front screed 30 is located on the center line L2 when the rear end of the left rear screed 31L is located at a point indicated by an arrow AR11. Also, the target trajectory TR4 is set such that the rear-end center part of the front screed 30 remains on the center line L2 until the rear end of the left rear screed 31L reaches a point indicated by an arrow AR12. Further, the target trajectory TR4 is set such that the rear-end center part of the front screed 30 is located on the center line L1 when the rear end of the left rear screed 31L is located at a point indicated by an arrow AR13.

The controller 50 moves the asphalt finisher 100 such that the rear-end center part of the front screed 30 moves along the target trajectory TR4.

Also, the controller 50 starts extending the left rear screed 31L and the right rear screed 31R when the rear end of the left rear screed 31L is located at the point indicated by the arrow AR10, and stops extending the left rear screed 31L and the right rear screed 31R when the rear end of the left rear screed 31L reaches or comes close to the point indicated by the arrow AR11. Also, the controller 50 starts retracting the left rear screed 31L and the right rear screed 31R when the rear end of the left rear screed 31L is located at the point indicated by the arrow AR12, and stops retracting the left rear screed 31L and the right rear screed 31R when the rear end of the left rear screed 31L reaches or comes close to the point indicated by the arrow AR13.

With the pavement support process as described above, the controller 50 can support the operator in operating the asphalt finisher 100 so that the widened part WD is properly paved even when the asphalt finisher 100 is moved in the positioning support process such that the center line L0 of the tractor 1 is aligned with the center line L1 instead of the center line L2. This is because the controller 50 can align the center line L0 of the tractor 1 with the center line L2 of the pavement target area including the widened part WD while the asphalt finisher 100 is traveling and before the asphalt finisher 100 reaches the widened part WD.

In the example of FIG. 8A, the controller 50 sets the target trajectory TR3 so that the asphalt finisher 100 moves relatively moderately in the vehicle width direction and an adverse effect due to abrupt steering can be prevented.

In the example of FIG. 8B, because the controller 50 sets the target trajectory TR4 such that the asphalt finisher 100 moves relatively quickly in the vehicle width direction, the extent of an adverse effect caused by the movement of the asphalt finisher 100 in the vehicle width direction can be limited.

As described above, the asphalt finisher 100 according to the embodiment of the present invention includes the tractor 1, the hopper 2 that is disposed in front of the tractor 1 and receives a pavement material, the conveyor CV that conveys the pavement material in the hopper 2 to the rear side of the tractor 1, the screw SC that spreads the pavement material conveyed by the conveyor CV at the rear side of the tractor 1, the screed 3 that compacts the pavement material spread by the screw SC at the rear side of the screw SC, the information acquisition device 51 that obtains information on a road to be paved, and the controller 50 used as a control device. The controller 50 is configured to support the operation of aligning the center of the tractor 1 with the center of a pavement target area based on the information obtained by the information acquisition device 51.

This configuration makes it possible to improve the efficiency of pavement work. This is because the operator of the asphalt finisher 100 can place the asphalt finisher 100 in a position suitable for the width of a pavement target area before the pavement work is started. For example, this configuration can prevent the occurrence of an unpaved part as illustrated in FIG. 6B, which is caused by improper placement of the asphalt finisher 100. Accordingly, this configuration makes it possible to reduce manual work necessary to finish such an unpaved part and thereby makes it possible to improve the efficiency of the entire pavement work.

Also, this configuration can basically equalize the extended/retracted lengths of the right and left rear screeds 31, and enables the asphalt finisher 100 to stably perform the subsequent pavement work. This is because the configuration can prevent the deterioration of the straight-running stability of the asphalt finisher 100 due to the uneven extended/retracted lengths of the right and left rear screeds 31.

For example, the controller 50 may be configured to autonomously control the movement of the tractor 1 based on information obtained by the information acquisition device 51 to align the center of the tractor 1 with the center of the pavement target area. With this configuration, the asphalt finisher 100 is autonomously placed in a position suitable for the pavement target area. Therefore, this configuration can reduce the load the operator in the positioning operation of the asphalt finisher 100. For example, this configuration can prevent the positioning operation from being performed repeatedly due to improper manual operations of the steering device 54 and the travel dial 55 by the operator, and thereby makes it possible to improve the efficiency of the entire pavement work.

For example, the controller 50 may be configured to report the magnitude of the distance between the center of the tractor 1 and the center of the pavement target area to the outside using at least one of sound, light, and vibration. This configuration can support the operator in manual operations of, for example, the steering device 54 and the travel dial 55 during the positioning operation.

The center of the pavement target area may be determined, for example, based on the maximum width of the pavement target area. For example, as illustrated in FIGS. 6A to 6C, when the pavement target area includes the widened part WD, the center of the pavement target area may be determined based on the width W2 of a portion including the widened part WD instead of the width W1 of a portion not including the widened part WD.

Specifically, the controller 50 may adopt the center line L2 of the portion including the widened part WD, instead of the center line L1 of the portion not including the widened part WD, as the center line of the pavement target area. With this configuration, the controller 50 can prevent the amount of extension of the rear screed 31 from becoming insufficient to pave the widened part WD.

The information acquisition device 51 is, for example, a camera or a LIDAR. In this case, the controller 50 may be configured to determine the center of the pavement target area based on an output of the camera or the LIDAR used as the information acquisition device 51.

The controller 50 may be configured to support an operation for aligning the center of the tractor 1 with the center of the pavement target area based on prestored information on the pavement target area and an output of the positioning device 60 attached to the tractor 1. With this configuration, the controller 50 can achieve the above-described effects without using an output of the camera or the LIDAR used as the information acquisition device 51.

The screed 3 typically includes the front screed 30 and the rear screed 31 that are shifted from each other in the vehicle length direction. The rear screed 31 includes the left rear screed 31L configured to be extended and retracted at the left side of the front screed 30 and the right rear screed 31R configured to be extended and retracted at the right side the front screed 30. In this case, for example, as illustrated in FIG. 8B, the center of the pavement target area may be determined such that the amount of extension of the left rear screed 31L and the amount of extension of the right rear screed 31R become substantially the same during the most part of the pavement work. In this case, the rear screed 31 may be configured to extended and retracted during the traveling.

A preferred embodiment of the present invention is described above. However, the present invention is not limited to the above-described embodiment, and various modifications or substitutions may be applied to the above-described embodiment without departing from the scope of the present invention. Also, the features described in the above embodiment may be combined as needed as long as they do not technically contradict with each other.

For example, in the embodiment described above, the asphalt finisher 100 is configured to support operations performed by the operator to pave a pavement target area that extends straight. However, the asphalt finisher 100 may be configured to support operations performed by the operator to pave a pavement target area that includes a bend.

Also, in the above embodiment, the asphalt finisher 100 is configured to support operations performed by the operator when paving the entire width of a target road at the same time. However, the asphalt finisher 100 may be configured to support operations performed by the operator when paving only one lane of a target road.

An asphalt finisher according to an embodiment of the present invention can improve the efficiency of pavement work by properly positioning the machine body.

What is claimed is:

1. An asphalt finisher, comprising:
   a tractor;
   a hopper disposed in front of the tractor and configured to receive a pavement material;
   a conveyor configured to convey the pavement material in the hopper to a rear side of the tractor;
   a screw configured to spread the pavement material conveyed by the conveyor at the rear side of the tractor;
   a screed configured to compact the pavement material spread by the screw at a rear side of the screw;
   a positioning device configured to detect a position of the asphalt finisher;
   a camera configured to capture an image of a space in front of the asphalt finisher;
   a display configured to display the captured image; and
   a hardware processor configured to
      derive a center line of a pavement target area of a road based on a maximum width of the pavement target area included in design data stored in a non-volatile storage and on the position of the asphalt finisher detected by the positioning device, the center line of the pavement target area not coinciding with a center line of the road in all of the pavement target area,
      support an operation of aligning a center line of the tractor with the derived center line of the pavement target area, and
      superimpose a figure representing the center line of the tractor, a figure representing the derived center line of the pavement target area, and a figure representing an amount of misalignment between the center line of the tractor and the derived center line of the pavement target area on the captured image displayed on the display, the figure representing the amount of misalignment being an arrow pointing to a direction in which the derived center line of the pavement target area exists relative to the center line of the tractor.

2. The asphalt finisher as claimed in claim 1, wherein the hardware processor is configured to control movement of the tractor to align the center line of the tractor with the derived center line of the pavement target area based on information on the target pavement area included in the stored design data and on the position of the asphalt finisher detected by the positioning device.

3. The asphalt finisher as claimed in claim 1, wherein the hardware processor is configured to report a magnitude of a distance between the center line of the tractor and the derived center line of the pavement target area by using at least one of sound, light, and vibration.

4. The asphalt finisher as claimed in claim 1, wherein the positioning device is attached to the tractor.

5. The asphalt finisher as claimed in claim 1, wherein
the screed includes a front screed and a rear screed that are shifted from each other in a vehicle length direction;
the rear screed includes a left rear screed configured to be extended and retracted at a left side of the front screed and a right rear screed configured to be extended and retracted at a right side of the front screed; and
the center line of the pavement target area is determined such that an amount of extension of the left rear screed and an amount of extension of the right rear screed become equal to each other.

6. The asphalt finisher as claimed in claim 5, wherein the rear screed is configured to be extended and retracted during traveling.

\* \* \* \* \*